Feb. 9, 1971 P. N. KESTEN ET AL 3,562,186
CERAMIC-TO-METAL CONDUCTIVE GLASS SEAL
AND SPARK PLUG USING SAME
Filed March 2, 1970
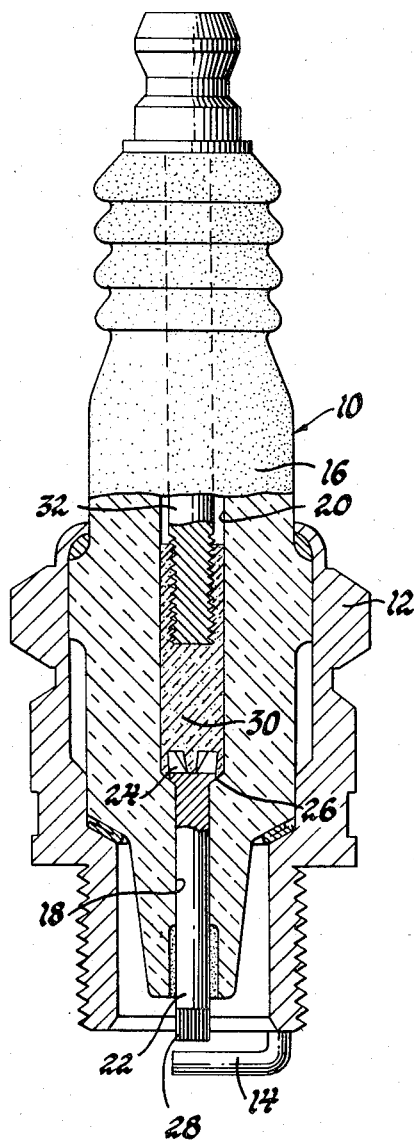
INVENTORS
Patrick N. Kesten,
Richard A. Webb &
BY William M. Flock
Sidney Carter
ATTORNEY United States Patent Office 3,562,186
Patented Feb. 9, 1971

3,562,186
CERAMIC-TO-METAL CONDUCTIVE GLASS SEAL AND SPARK PLUG USING SAME
Patrick N. Kesten and Richard A. Webb, Davison, and William M. Flock, Flint, Mich., assignors to General Motors Corporation, Detroit, Mich., a corporation of Delaware
Continuation-in-part of application Ser. No. 846,728, Aug. 1, 1969. This application Mar. 2, 1970, Ser. No. 15,963
Int. Cl. H01b 1/02; H01t 13/20
U.S. Cl. 252—513                             10 Claims

ABSTRACT OF THE DISCLOSURE

This invention relates to an improved ceramic-to-metal conductive glass seal for ceramic insulators and more particularly to compositions comprising glass, iron, copper, and aluminum which are suited for use in the centerbore of spark plugs. The improved seal of our invention comprises a mixture on a weight basis of about 50–65 parts iron, 1–4 parts copper, 3–5 parts aluminum, and 30–45 parts glass; a preferred embodiment comprises about 56 parts iron, 2 parts copper, 3 parts aluminum, and 39 parts glass. The addition of a filler material such as mullite enables the broadening of the range of our composition to about 35–55 parts iron, 1–4 parts copper, 3–5 parts aluminum and 30–50 parts glass, the filler being present in an amount of about 5–15 parts; a preferred embodiment comprises about 45 parts iron, 2 parts copper, 3 parts aluminum, 40 parts glass and 10 parts mullite.

---

This application is a continuation-in-part of Ser. No. 846,728, field Aug. 1, 1969 and now abandoned.

It is common practice in the spark plug art to form a part of the center electrode conductive path extending through the insulator by use of a fused composition of glass and electrically conductive material which composition bonds to the ceramic insulator wall, the center electrode, and the terminal screw to form an electrically conductive path and a hermetic seal. Such seals are shown, by way of example, by U.S. Pat. 2,248,415 issued to K. Schwartzwalder et al. and 3,247,132 issued to H. G. Schurecht et al. The patent to Schwartzwalder et al. discloses a seal consisting of about 45–70 percent of a metal selected from the group of copper, iron, cobalt, nickel, tungsten, and molybdenum, the balance being glass. The patent to Schurecht discloses a seal comprising about 55–85 parts glass, about 6–20 parts aluminum, about 10–40 parts of a mixture of metals consisting of about 2–28 parts of any one of silicon, nickel, copper, silver, platinum, chromium, and cobalt and from 7–29 parts of any one of the metals bismuth, lead, and lead-tin solders. A composition which is currently used in forming such conductive glass seals in high production automobile-type spark plugs consists of about 40–60 weight percent copper, 10–30 weight percent zinc or manganese, and 25–35 weight percent glass.

In view of the continuing trend toward higher operating pressures and temperatures within the engine cylinders in order to achieve better engine performance and the maximum completeness of combustion to minimize undesired contaminants in exhaust gases, we have found it desirable to develop a glass seal composition which can withstand the more rigorous operating conditions to which a spark plug is subjected. Also, from the standpoint of efficiency and cost of production, we have found it necessary to develop a composition which is substantially less as to cost of materials than that currently used in production as well as one which can withstand prolonged periods of exposure to high temperatures during the sealing operation without change in either the electrical or physical properties of the molten mass.

It is a primary object of this invention to provide a hermetic conductive glass seal composition which is formable at temperatures up to about 1750° F. It is another object of our invention to provide a seal composition which may be formed at low cost utilizing standard spark plug production techniques. It is still another object of our invention to provide a spark plug having a hermetically sealed center electrode wherein the seal is capable of withstanding temperatures as high as about 1750° F. and is relatively inexpensive to produce.

These and other objects of our invention are achieved by a metal-glass sealing composition comprising a mixture on a parts by weight basis of about 50–65 parts iron, about 1–4 parts copper, about 3–5 parts aluminum, and about 30–45 parts glass. We have also found that the addition of a filler material such as mullite enables the broadening of the range of our composition to about 35–55 parts iron, 1–4 parts copper, 3–5 parts aluminum, and 30–50 parts glass, the filler being present in an amount of about 5–15 parts. A spark plug having such composition as a conductive glass seal between the terminal screw and the center electrode and within the insulator centerbore is capable of being formed at temperatures as high as 1750° F. and may withstand such temperatures during the forming operation for extended periods of time without deterioration of its physical or electrical properties as by losing electrical conductivity due to oxidation of the metal powders and by a thickening of the glass due to interaction of the metal and the glass with a loss of its flow characteristics.

Referring now to the drawing, there is shown a spark plug 10 comprising an outer metal shell 12 having a ground electrode 14 secured to the lower end thereof. Positioned within the metal shell 12 and sealed therein in the conventional manner is a ceramic insulator 16 which may be made of a high alumina base composition such as that covered by U.S. Pat. 2,760,875 issued to K. Schwartzwalder et al. The insulator 16 is formed with a centerbore having a lower portion 18 and an enlarged upper portion 20, a center electrode 22 being positioned in the centerbore, an enlarged head 24 of the center electrode being positioned on the ledge 26 of the insulator bore. The firing tip 28 of the center electrode projects beyond the tip of the insulator 16 and is fixed in firing position with respect to the ground electrode 14. The terminal screw 32 is positioned in the upper portion 20 of the centerbore. The electrically conductive metal-glass seal 30 is bonded to the center electrode head 24, the terminal screw 32, and the inner wall surface of the ceramic insulator 16 to provide an electrical path from the terminal screw 32 to the center electrode 22 while at the same time maintaining a hermetic seal in the centerbore.

As noted above, the metal glass seal composition of our invention is a fused, glassy, substantially homogeneous mixture comprising powders of iron, copper, aluminum, and glass and consisting essentially of approximately 50–65 parts by weight iron, approximately 1–4 parts copper, approximately 3–5 parts aluminum, and approximately 30–45 parts glass. Also as noted, the addition of a filler material such as mullite enables the broadening of the range of our composition to about 35–55 parts iron, 1–4 parts copper, 3–5 parts aluminum and 30–50 parts glass, the filler being present in an amount of about 5–15 parts. In addition to mullite, we have found that such materials as kyanite, alumina—e.g. tabular corundum, and silica may be used as filler in the compositions of our invention, such materials being 40 mesh or finer. We have found that an alloying reaction between the iron and aluminum proceeds very rapidly at the seal forming temperatures of from 1500 to 1700° F. and produces a high strength seal in about 15–18 minutes transit time through the forming furnace. We have also found that the compositions of our invention result in a seal which has a backup temperature of from 50 to 150° F. higher than that of the seal composition currently used in production, the backup temperature being that temperature at which the terminal flange raises from the insulator butt area due to the softening and expansion of the seal within the centerbore. For the purposes of testing and production, a terminal backup temperature below 1400° F. is considered a failure. We have found that the compositions of our invention result in backup temperatures of from 1500 to 1600° F. The highest backup temperatures are obtained, we find, when using metal powders of less than 200 mesh size.

As a result of extended testing we have also found that the thermal expansion characteristics of the compositions of our invention are such as to constitute a closer match with the thermal expansion characteristics of alumina insulators than that achieved with current seal compositions. This is of course important to assure long life for the spark plug over the wide range of operating temperatures to which it is subjected in normal operation. Similarly, we have found that the compositions of our invention are not adversely affected when the insulator subassembly is unavoidably retained in the forming furnace for periods of up 1½ hours of temperatures as high as about 1750° F. Such stoppage in the furnace flow is possible due to backup in production resulting from a failure at some point in the production line. Under such conditions of prolonged retention, it has been found that the seals of our invention do not oxidize and therefore retain their designed electrically conductive characteristics. Also, we find that during such period the metal powders do not absorb the glass phase to any substantial degree with the result that our compositions retain their fluidity characteristics and therefore enable the desired hermetic seal to be achieved with the desired degree of coverage and adhesion to the serrations on the bottom of the terminal screw.

While, the iron and copper of our compositions may be added as separate powders, we have found it convenient to use a prealloyed powder of iron and copper, more specifically, a powder metal alloy containing about 96% iron and 4% copper. Such metal alloy powders are available commercially for use in powder metallurgy processing and are known as preinfiltrated powders and are available from companies such as Chas. Pfizer & Co.

Based on extensive experimentation and test we have found that a preferred embodiment comprises a mixture of approximately 55.7 parts by weight iron, approximately 2.3 parts copper, approximately 3 parts aluminum, and approximately 39 parts glass. Where a filler is used, a preferred embodiment comprises about 45 parts iron, 2 parts copper, 3 parts aluminum, 40 parts glass and 10 parts mullite. In accordance with the known teachings of the prior art we have found it advantageous to add a small amount of a glass flux to improve the fluidity of the seal during the forming process to enable proper coverage of the terminal screw. A preferred flux consists of lithium carbonate though other fluxes such as lead oxide and even barium oxide may be used. We have found that the desired fluidity characteristics are achieved by additions of from about .7 to 3 parts by weight of lithium carbonate, a preferred amount being about 2 parts by weight.

We have also found it to be advantageous to add a small amount of carbon to the mixture of glass and metal powders, the carbon being added in a small but sufficient amount to create a reducing atmosphere in the glass during the forming operation in order to prevent oxidation of the metal. We found that such a small but sufficient amount is represented by 1 part by weight of the carbon in the mixture. The carbon may be obtained from such sources as dextrine or hydrogenated cottonseed oil, our preference being hydrogenated cottonseed oil which also acts as a binder in the powder-glass mix. In order to prevent rusting of the iron powder where a batch of glass-powder mix will be permitted to stand in moist atmospheres, we have found that the use of various oil and wax type coatings are advantageously added. Such rust inhibitors are mineral oil, glycerine, water soluble oils, cottonseed oil, corn syrup, wax solutions, linseed oil, and silicone resins. We have found that a 1:1 mixture of corn syrup and water serves very well when added in an amount of about 18 parts by weight of the powder-glass mixture.

The glass in the composition of our invention is the conventional boro-slicate type glass commonly known as Pyrex, this being presently used in the production of glass seals in automotive spark plugs. The use of such a glass is as disclosed in the patent to Blum et. al. 3,349,275 though we have found that other glass materials commonly used in spark plugs such as barium borate type glass are also suitable. We prefer that the glass used be of a 325 mesh size.

Based on our extensive testing the following tabulation shows the causes of failure when the constituents in our composition are varied from that disclosed and claimed herein.

(1) Excess iron results in failure due to cold leaks, that is, air at room temperature will leak through the seal area when the spark plug assembly is subjected to 300# air pressure;

(2) Excess glass causes life test failures, that is, one observes an increase in resistance when the insulator assembly is subjected to 18 kilovolts for a one minute period, this indicating nonstable electrical conditions;

(3) Excess aluminum causes cold leaks whereas insufficient aluminum causes life test failure;

(4) Excess glass flux causes hot and cold leaks, the hot leak test using air heated to a temperature of about 600° F. with the air pressure being 300# as in the case of the cold leak test. Insufficient glass flux has been found to cause cold leaks;

(5) Excess copper decreases the terminal backup temperature;

(6) Excess filler stiffens the mixture during hot sealing and the softened mixture will not flow sufficiently freely to seal adequately about the terminal screw to meet the test standards used.

It should be understood however that suitable fluidity of the glass-powder mix can be obtained without the use of a glass-flux depending upon the forming process used.

In forming the seals of our invention we have used a process comprising the following steps:

(1) Dry mixing of the glass-metal powder constituents for approximately ½ hour;

(2) Addition of a binder and rust inhibitor such as corn syrup in a 1:1 water solution in an amount of about 18% of the weight of the powder mixture, the materials being then mixed for approximately an additional ½ hour;

(3) Granulation of the material to pass through a 20 mesh screen followed by drying and screening through a 20 mesh, the materials retained on a 100 mesh screen being used in forming the hermetic seal within the spark plug insulator centerbore;

(4) The materials are loaded into the centerbore on top of the center electrode, the terminal screw being positioned within the centerbore on top of the materials;

(5) And the insulator is passed through an oven at a temperature of from about 1500 to 1700° F., the terminal screw being pressed into the materials.

As disclosed above, we have developed a glass seal composition for use in spark plug insulator centerbores wherein a hermetic seal is achieved between the metal portions within the centerbore while at the same time establishing good electrical contact therebetween. The resultant assembly is one which is capable of operating at current high levels of temperature and pressure and is nonetheless relatively inexpensive in that the major constituent is iron and the more expensive constituent, copper, is present in only very small amounts as defined in the specification and the claims which follow.

What is claimed is:

1. An electrically conductive hermetic seal adapted to operate at elevated temperatures in a ceramic insulator wherein the seal contains on a parts by weight basis at least about 50 parts iron, about 4 to 6 parts copper together with aluminum, and the balance being glass in an amount not less than about 30 parts by weight, said aluminum being present in an amount of at least about 3 parts and said copper in an amount of at least about 1 part, said glass having a softening temperature of between 1560 and 1600° F.

2. An electrically conductive hermetic seal as set forth in claim 1 adapted to be formed at temperatures as high as about 1750° F. where said temperature is maintained for periods as long as 1½ hours, wherein the seal contains on a parts by weight basis approximately 50–65 parts iron, about 1–4 parts copper, about 3–5 parts aluminum, and about 30–45 parts glass, said glass having a softening temperature of between 1560 and 1600° F.

3. A seal composition in accordance with claim 2 consisting essentially of approximately 56 parts iron, approximately 2 parts copper, approximately 3 parts aluminum, and approximately 39 parts glass, a small but sufficient amount of carbon being present to assure a reducing atmosphere in the glass during the seal forming operation in order to prevent oxidation of the metals, said glass being selected from the group of boro-silicate and barium borate type glass.

4. A seal composition in accordance with claim 3 wherein a glass flux is added in the amount of from about 0.7 to 3 parts by weight of the glass-metal powder.

5. An electrically conductive hermetic seal adapted to operate at elevated temperatures in a ceramic insulator wherein the seal contains on a parts by weight basis about 35–55 parts iron, about 1–4 parts copper, about 3–5 parts aluminum, about 30–50 parts glass, and about 5–15 parts filler, said glass having a softening temperature of between 1560 and 1600° F.

6. A seal as set forth in claim 5 consisting essentially of about 45 parts iron, about 2 parts copper, about 3 parts aluminum, about 40 parts glass and about 10 parts mullite.

7. A spark plug adapted to operate at elevated temperatures comprising a ceramic insulator having a centerbore therethrough, a metal terminal in the top portion of said centerbore and a metal center electrode in the bottom portion thereof spaced apart from said terminal, said metal members being electrically interconnected and being hermetically sealed within said centerbore by a glassy fused mass consisting essentially of approxiamtely 50–65 parts by weight iron, approximately 1–4 parts copper, approximately 3–5 parts aluminum, and approximately 56 parts iron, approximately 2 parts copper, aptemperature of between 1560 and 1600° F.

8. A spark plug in accordance with claim 7 wherein said glassy fused mass consists essentially of approximately 56 parts iron, approximately 2 parts copper, approximately 3 parts aluminum, and approximately 39 parts glass, said spark plug being adapted to operate at temperatures as high as 1750° F., said glass being selected from the group of boro-silicate and barium borate type glass.

9. A spark plug in accordance with claim 7 wherein said glassy fused mass consisted essentially of about 35–55 parts iron, about 1–4 parts copper, about 3–5 parts aluminum, about 30–50 parts glass, and about 5–15 parts filler, said spark plug being adapted to operate at temperatures as high as 1750° F., said glass having a softening temperature of between 1560 and 1600° F.

10. A spark plug in accordance with claim 7 wherein said glassy fused mass consists essentally of about 45 parts iron, about 2 parts copper, about 3 parts aluminum, about 40 parts glass and about 10 parts mullite, said spark plug being adapted to operate at temperatures as high as 1750° F.

References Cited

UNITED STATES PATENTS

| | | | |
|---|---|---|---|
| 3,349,275 | 10/1967 | Blum et al. | 313—136 |
| 3,360,676 | 12/1967 | Esper et al. | 313—136 |

DOUGLAS J. DRUMMOND, Primary Examiner

U.S. Cl. X.R.

313—136

PO-1050
(5/69)

UNITED STATES PATENT OFFICE
CERTIFICATE OF CORRECTION

Patent No. 3,562,186         Dated Feb. 9, 1971

Inventor(s) Patrick N. Kesten and Richard A. Webb

It is certified that error appears in the above-identified patent and that said Letters Patent are hereby corrected as shown below:

Column 3, line 27, after "of up" insert -- to --.

Column 4, line 11, "-slicate" should read -- silicate

Column 6, claim 7, line 8, "approxiamtely" should rea -- approximately --;  line 11, delete "56 parts iron, approximately 2 parts copper, ap-" and substitute -- 30-45 parts glass, said glass having a softening --.

Column 6, claim 10, line 2, "essentally" should read -- essentially --.

Signed and sealed this 15th day of June 1971.

(SEAL)
Attest:

EDWARD M.FLETCHER,JR.
Attesting Officer

WILLIAM E. SCHUYLER, J.
Commissioner of Patent